United States Patent
Shapiro et al.

(10) Patent No.: US 10,162,514 B2
(45) Date of Patent: Dec. 25, 2018

(54) LARGE DISPLAY FORMAT TOUCH GESTURE INTERFACE

(71) Applicant: Rockwell Collins, Inc., Cedar Rapids, IA (US)

(72) Inventors: Geoffrey A. Shapiro, Cedar Rapids, IA (US); David L. Leedom, Center Point, IA (US); Matthew M. Lorch, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 461 days.

(21) Appl. No.: 14/855,006

(22) Filed: Sep. 15, 2015

(65) Prior Publication Data

US 2017/0075558 A1    Mar. 16, 2017

(51) Int. Cl.
*G06F 3/048* (2013.01)
*G06F 3/0488* (2013.01)
*G06F 3/0482* (2013.01)
*G09G 5/14* (2006.01)
*G09G 5/12* (2006.01)
*G09G 5/38* (2006.01)
(Continued)

(52) U.S. Cl.
CPC ........ *G06F 3/04883* (2013.01); *G06F 3/0482* (2013.01); *G06F 3/0489* (2013.01); *G06F 3/04845* (2013.01); *G06F 3/04847* (2013.01); *G06F 3/04886* (2013.01); *G06F 3/147* (2013.01); *G06F 3/1423* (2013.01); *G06F 3/1454* (2013.01); *G09G 5/12* (2013.01); *G09G 5/14* (2013.01); *G09G 5/38* (2013.01); *G06F 2203/04104* (2013.01); *G09G 2330/08* (2013.01); *G09G 2340/0464* (2013.01); *G09G 2354/00* (2013.01); *G09G 2380/12* (2013.01)

(58) Field of Classification Search
CPC ............... G06F 3/04883; G06F 3/0482; G06F 3/04845; G06F 3/04847; G06F 3/04886; G06F 3/0489; G06F 3/1423; G06F 3/1454; G06F 3/147; G09G 5/12; G09G 5/14; G09G 5/38
USPC ........................................................ 715/716
See application file for complete search history.

(56) References Cited

U.S. PATENT DOCUMENTS 8,330,732 B2   12/2012  Nutaro et al.
8,364,328 B2   1/2013   Hedrick
(Continued)

*Primary Examiner* — David Phantana-angkool
(74) *Attorney, Agent, or Firm* — Angel N. Gerdzhikov; Donna P. Suchy; Daniel M. Barbieri

(57) ABSTRACT

A system and method for an interactive avionics display system integrates a large-format primary avionics display, a secondary avionics display capable of mirroring the display of electronic flight bag mobile devices, a format selector panel, and a keyboard panel. Background displays and foreground multifunction windows generated by the display system house applications and display relevant avionics data. The multifunction windows can be resized or repositioned on the display surface using finger contacts and gestures. Format selector panels include control selectors corresponding to the multifunction windows, the control selectors responsive to finger contact with the format selector panels or the corresponding multifunction windows. Keyboard panels provide touch-sensitive radio and communications controls as well as an alphanumeric keyboard responsive to finger contact with text fields generated by the display.

18 Claims, 10 Drawing Sheets

(51) Int. Cl.
   *G06F 3/0484*   (2013.01)
   *G06F 3/0489*   (2013.01)
   *G06F 3/14*     (2006.01)
   *G06F 3/147*    (2006.01)

(56) References Cited

U.S. PATENT DOCUMENTS

| | | |
|---|---|---|
| 8,681,109 B2 | 3/2014 | Grothe |
| 8,768,541 B2 | 7/2014 | Detouillon et al. |
| 9,284,045 B1* | 3/2016 | Springer ................ G08G 5/003 |
| 9,671,954 B1* | 6/2017 | Jaugilas ................. G06F 3/044 |
| 9,672,745 B2* | 6/2017 | Kneuper ............. G08G 5/0021 |
| 2010/0152924 A1 | 6/2010 | Pandit et al. |
| 2011/0102198 A1* | 5/2011 | Deleris .................. B64D 43/00 340/971 |
| 2014/0063055 A1* | 3/2014 | Osterhout ............... G06F 3/005 345/633 |
| 2014/0074323 A1* | 3/2014 | Andre ................ G06F 3/04815 701/3 |
| 2014/0214246 A1 | 7/2014 | Johnson et al. |
| 2014/0300555 A1 | 10/2014 | Rogers |
| 2015/0262545 A1* | 9/2015 | Kneuper ............... G06F 3/0488 345/4 |
| 2015/0352952 A1* | 12/2015 | Kneuper ............... B60K 35/00 701/36 |
| 2016/0179327 A1* | 6/2016 | Zammit-Mangion ........................ G01C 23/00 701/7 |
| 2016/0180718 A1* | 6/2016 | Shapiro ............... G08G 5/0047 701/418 |
| 2017/0032576 A1* | 2/2017 | Mazoyer .............. G08G 5/0021 |
| 2017/0075558 A1* | 3/2017 | Shapiro ............... G06F 3/04883 |

* cited by examiner

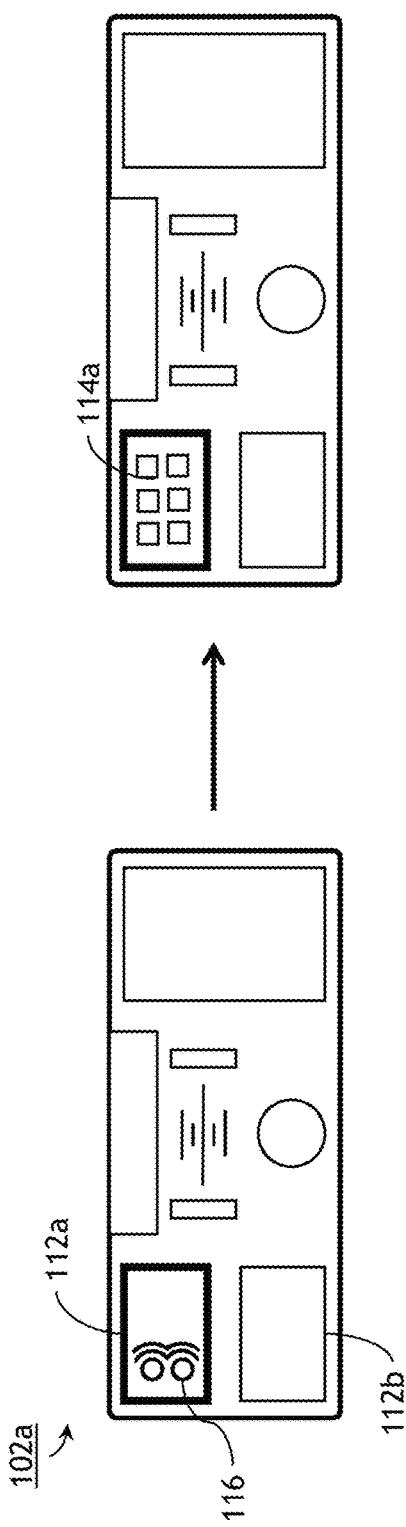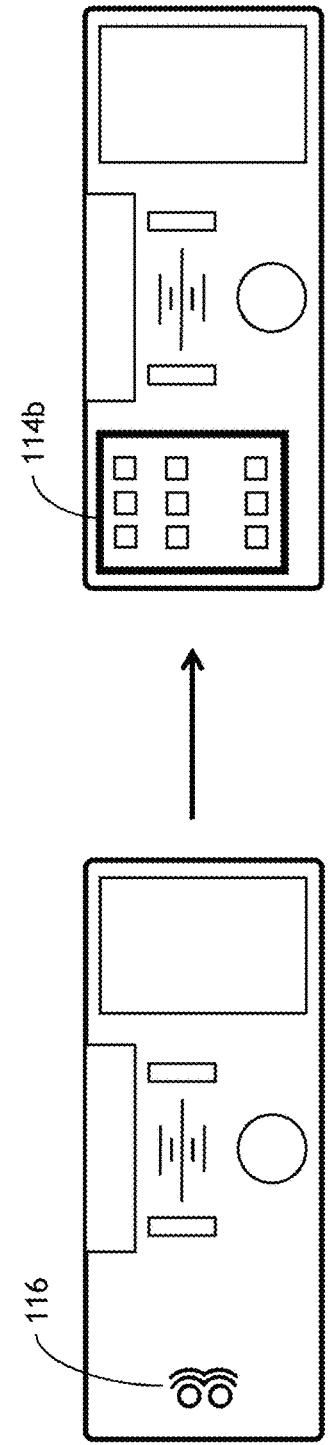

LARGE DISPLAY FORMAT TOUCH GESTURE INTERFACE

TECHNICAL FIELD

The inventive concepts disclosed herein relate generally to avionics displays installed in aircraft cockpits, and more particularly to touch-sensitive large-format displays installable aboard a variety of aircraft.

BACKGROUND

Many current avionics systems include groups of smaller-format displays (15 inches or less in diameter) without inter-display interactivity. This lack of interactivity, coupled with limited display space and cumbersome format control, requires additional workload both to configure the flight deck for a pilot and for the pilot to monitor relevant information inflight. A measure of data interactivity may be provided through the use of electronic flight bags (EFB) installed on a pad, tablet, or other portable computing device. The data interactivity provided does not rise to the level of full integration, however, and the EFB introduces new challenges. For example, in order to be accessible the EFB device may be suction-cupped to a bulkhead or window wherever space allows, or strapped to the pilot's leg. In either case, bad ergonomics and higher pilot error result. It may therefore be desirable to enhance pilot situational awareness by providing a fully integrated, large-scale flight deck avionics system with simplified and robust format control. It may further be desirable to provide an integrated flight avionics system that provides seamless interactivity with an EFB device without the need to physically interact with the EFB device itself.

SUMMARY

In one aspect, embodiments of the inventive concepts disclosed herein are directed to an avionics display system. For example, the avionics display system may include one or more large-scale primary avionics displays for displaying a background interface such as a synthetic vision system and multiple foreground interfaces, the various interfaces responsive to finger contacts and gestures. The avionics display system may include a secondary avionics display for rehosting EFB devices with which the avionics display system links (either wirelessly or via wired connection). The secondary avionics display may relay the interfaces of EFB applications through the display surface, responding to finger contacts and gestures with the interface and relaying avionics events to the EFB via wireless link. The avionics display system may include one or more format selector panels for displaying formatting menus of the primary avionics display interfaces, the format selector panel interfaces responsive to finger contacts on its surface or on the surface of the primary or secondary avionics display. The avionics display system may include one or more keyboard panels for displaying a radio tuning interface as well as an alphanumeric keyboard interface when text entry is required, e.g., the pilot touches a text field on a primary avionics display interface.

In a further aspect, the inventive concepts disclosed herein are directed to a method for format control via an avionics display, the method including generating a response via the avionics display system by performing at least one finger contact with interfaces displayed by at least one of a primary avionics display of the avionics display system, a secondary avionics display of the avionics display system, a format selector panel of the avionics display system, and a keyboard panel of the avionics display system.

BRIEF DESCRIPTION OF THE DRAWINGS

The inventive concepts disclosed herein may be better understood by those skilled in the art by reference to the accompanying figures in which:

FIGS. 2A, 2B, 3A, 3B, 3C, and 3D are diagrammatic illustrations of a primary avionics display according to embodiments of the inventive concepts disclosed herein;

DETAILED DESCRIPTION

Features of the inventive concepts disclosed herein in their various embodiments are exemplified by the following descriptions with reference to the accompanying drawings, which describe the inventive concepts with further detail. It is to be understood that both the foregoing general description and the following detailed description are exemplary and explanatory only and are not necessarily restrictive of the inventive concepts disclosed and claimed herein. These drawings depict only exemplary embodiments of the inventive concepts, and should not be considered to limit their scope in any way.

Figure 1:
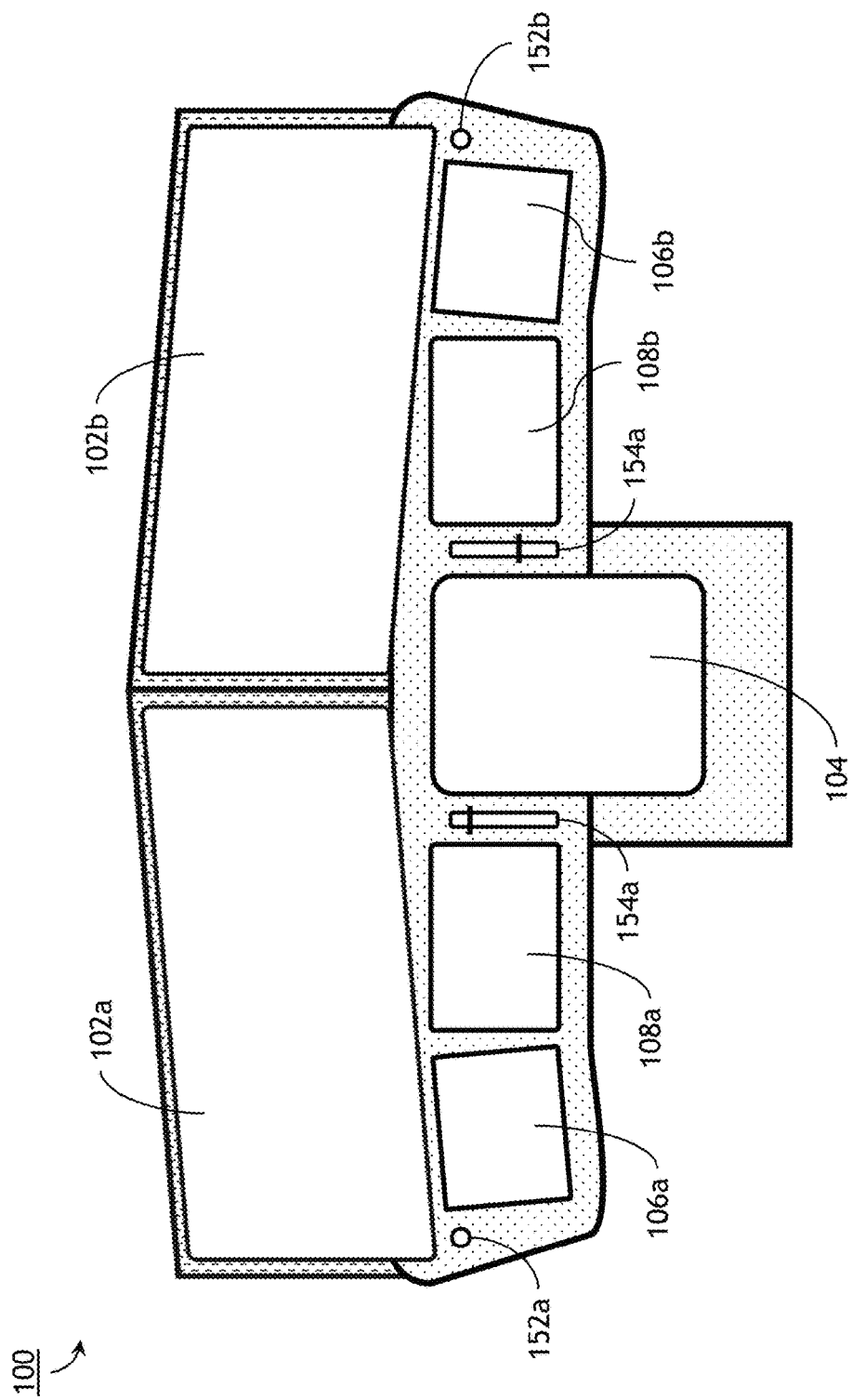
FIG. 1 is a diagrammatic illustration of an avionics display system according to embodiments of the inventive concepts disclosed herein.

Referring to FIG. 1, an avionics display system 100 may be installed in an aircraft cockpit. In one embodiment, the avionics display system 100 includes multiple touch-sensitive interactive display surfaces. For example, the avionics display system 100 may include one or more primary avionics displays 102, a secondary avionics display 104, one or more format selector panels (FSP) 106, and one or more keyboard panels 108. In one embodiment, as shown by FIG. 1, the avionics display system 100 includes a pilot-side primary avionics display 102a, format selector panel 106a, and keyboard panel 108a positioned for the use of a first pilot, as well as a co-pilot-side primary avionics display 102b, format selector panel 106b, and keyboard panel 108b positioned for the use of a second pilot, co-pilot, or crewmember. The primary avionics displays 102 may be large-format flat-glass immersive displays configured to display a variety of information to the pilot's peripheral and forward vision.

Figure 2A:
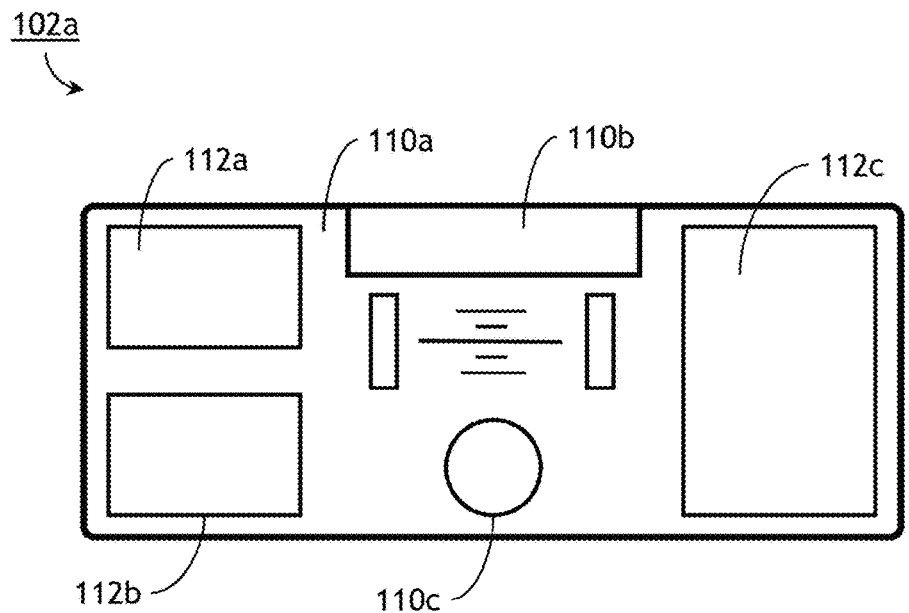
Figure 2B:
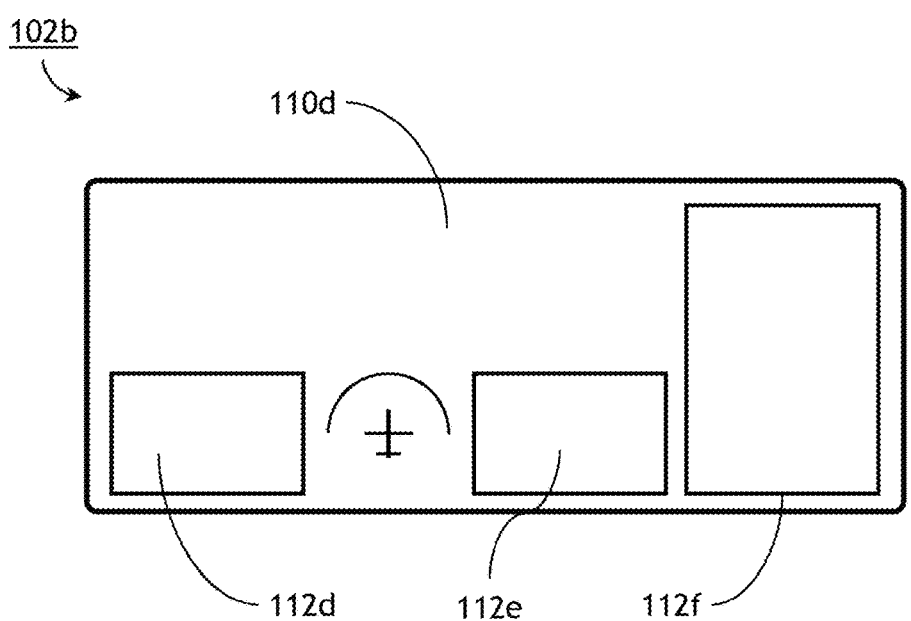

Referring also to FIGS. 2A and 2B, the primary avionics display 102 may display a full-screen background interface 110 as well as one or more multifunction windows (MFW) 112 in which foreground interfaces are displayed. Each foreground interface may be displayed in its own MFW 112, entirely within the boundaries of the background interface 110, whereby a portion of the background interface 110 can be seen between the edges of each MFW 112 and the edges of the primary avionics display 102. For example, the pilot-side primary avionics display 102a may have a default layout as shown by FIG. 2A, displaying a synthetic vision system (SVS) 110a as its background interface 110. The SVS 110a may include a flight mode annunciator (FMA) display 110b and a horizontal situation indicator (HSI) display and primary flight indicators 110c. The primary avionics display 102a may display foreground interfaces in quarter-size MFWs 112a, 112b and half-size MFW 112c. The MFWs 112 displayed by the primary avionics display 102 may include any combination of map displays, synoptic displays, engine indicator and crew alert system (EICAS) displays, chart displays (e.g., approach charts), systems management, and video displays. Similarly, the co-pilot-side primary avionics display 102b as shown by FIG. 2B may have a default layout including a full screen map display 110d displayed as its background interface 110. Foreground interfaces may be displayed by the primary avionics display 102b in quarter-sized MFWs 112d and 112e, and a Primary Flight Display (PFD) may be displayed in half-size MFW 112f.

Referring to FIGS. 3A and 3B, the primary avionics displays 102 may provide simplified format control via finger contacts or gestures performed by a pilot, co-pilot, or crew member. For example, FIG. 3A illustrates the pilot-side primary avionics display 102a. A pilot or other crewmember may generate a quarter-size format selection menu (FSM) 114a associated with the foreground interface (ex.—application) displayed in the corresponding quarter-size MFW 112a by touching and holding one or more fingers (116) to the quadrant of the surface of the pilot-side primary avionics display 102a corresponding to the MFW 112a in which the foreground interface is displayed. For example, "touching or holding" one or more fingers to a display (including any primary avionics display 102, secondary avionics display 104, format selector panel 106 or keyboard panel 108) refers to pressing the one or more fingers to the surface of a display and holding the one of more fingers in place (until the avionics display system 100 generates a response). A "touch-and-hold" may be followed by sliding the one or more fingers across the display surface as explained below. A similar FSM (not shown) corresponding to the interface displayed in the MFW 112b may be generated by touching and holding the one or more fingers to the MFW 112b in the lower left quadrant of the screen. Referring to FIG. 3B, the pilot may generate a half-size format selection menu 114b over the background interface 110a (i.e., an area of the background interface 110 over which a MFW 112 is not currently displayed) by touching and holding at least one finger (116) to a center-left portion of the surface of the pilot-side primary avionics display 102a, between the upper left and lower left display quadrants. A similar half-size FSM 114b (not shown) may be generated by a touch-and-hold performed in the center-right portion of the surface of the primary avionics display 102. Format selection menus 114 associated with foreground interfaces displayed in MFWs 112 by the secondary avionics display 104 may be generated in a similar fashion.

Figure 3C:
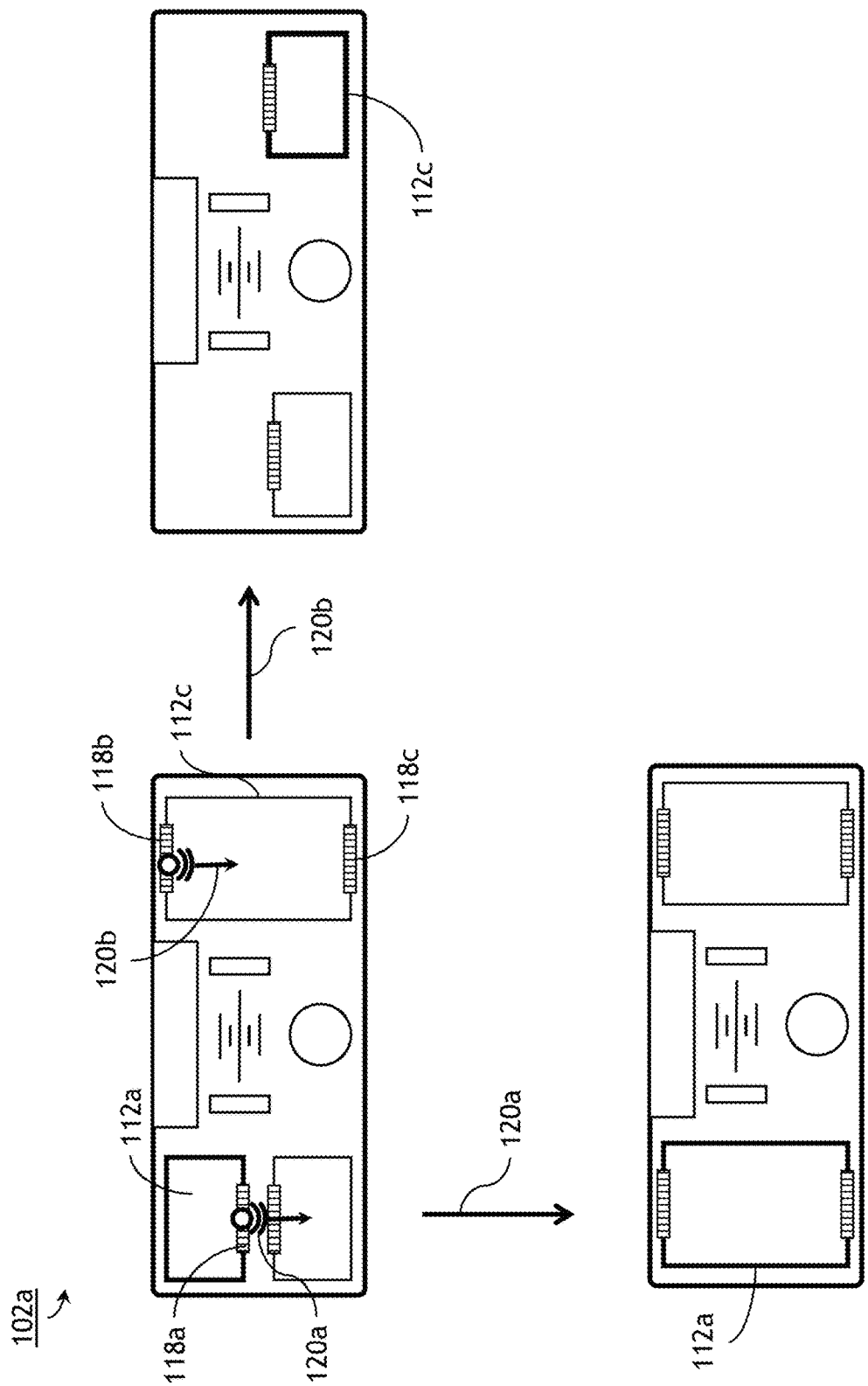
Figure 3D:
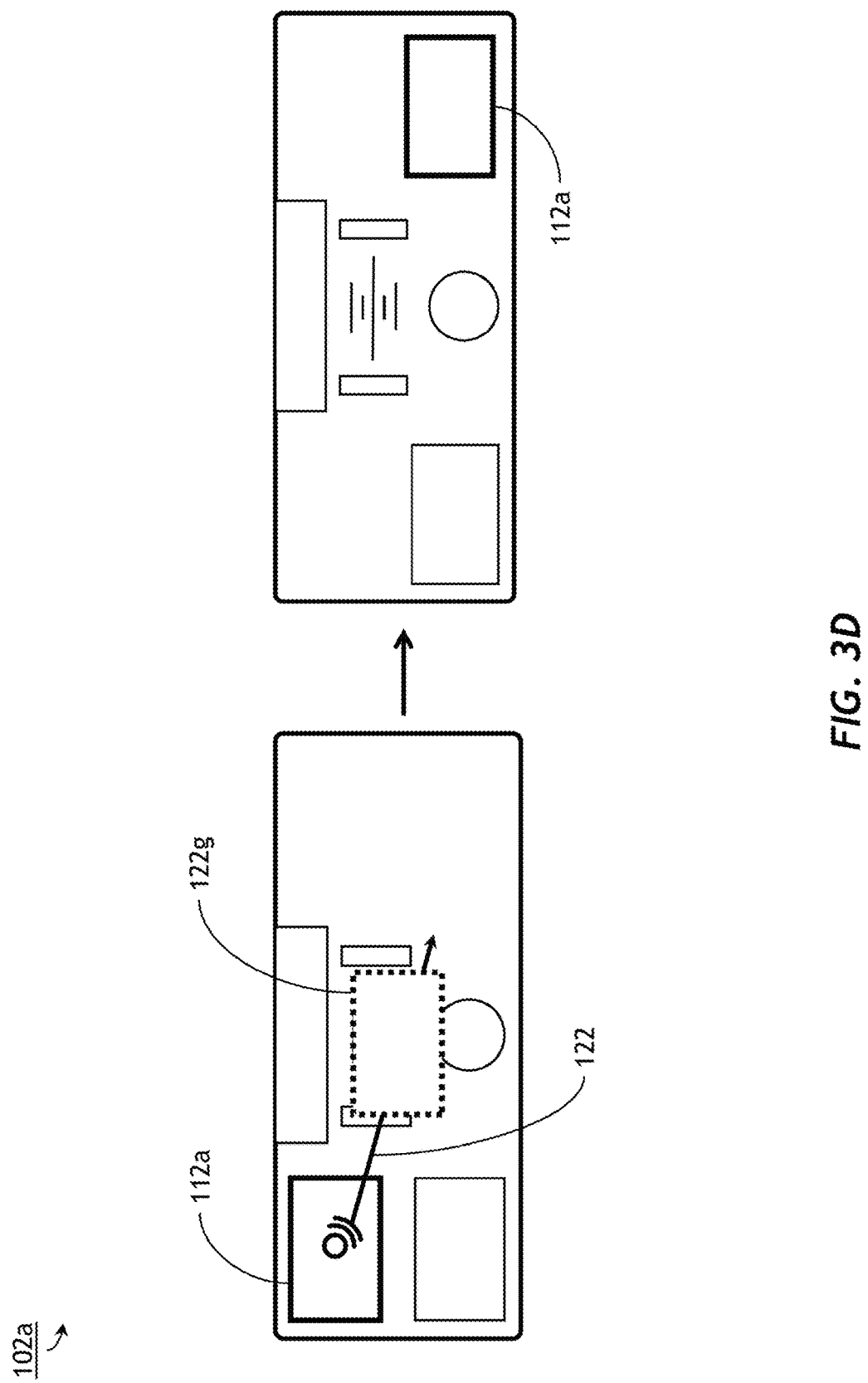

Referring to FIGS. 3C and 3D, the size or position of a MFW 112 may be changed by finger contacts or gestures. Referring to FIG. 3C, a pilot or crewmember may touch and hold one or more fingers to a swipe bar 118a placed at the bottom edge of the MFW 112a and swipe the finger directly downward (120a) along the surface of the primary avionics display 102a. The MFW 112a may expand downward in size from a quarter-size MFW to a half-size MFW, as shown by the lower left figure of MFW 112a. The presence of a swipe bar 118 along any edge of a MFW 112 may indicate the ability to expand or retract the MFW 112 by a touch-and-hold followed by a directional swipe 120. For example, the half-size MFW 112c includes swipe bars 118b and 118c along its top and bottom edges respectively. The pilot may touch and hold one or more fingers to the top swipe bar 118b and swipe directly downward (120b), reducing the size of the MFW 112c from half-size to quarter-size, as shown by the upper right figure of the MFW 112c. Referring to FIG. 3D, the pilot may touch and hold one or more fingers within the edges of a MFW 112a and swipe horizontally, vertically, or diagonally (122) toward a new quadrant (e.g., the lower right quadrant) of the pilot-side primary avionics display 102a. The primary avionics display 102a may guide the swipe by displaying a silhouette (112g) of the MFW 112a until the destination quadrant (or a silhouette of the growing/shrinking MFW, for a resizing swipe) is reached. Once the swipe has reached the destination quadrant, the MFW 112a may be repositioned from the original (upper left) quadrant to the destination (lower right) quadrant of the pilot-side primary avionics display 102a. Foreground interfaces displayed in MFWs 112 by the secondary avionics display 104 may be repositioned in a similar fashion.

Figure 4A:
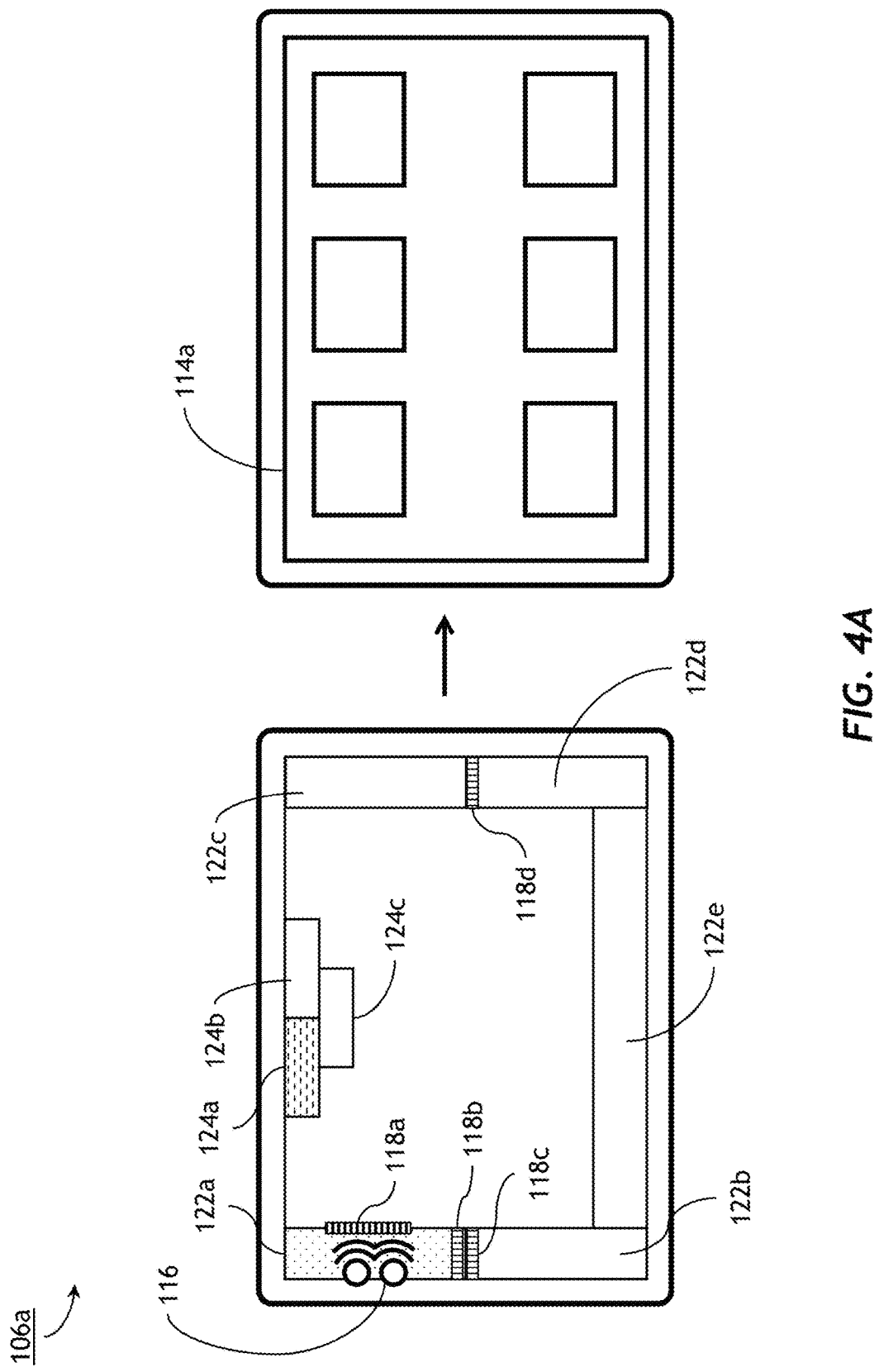
FIG. 4A is a diagrammatic illustration of a format selector panel according to embodiments of the inventive concepts disclosed herein.
Figure 4B:
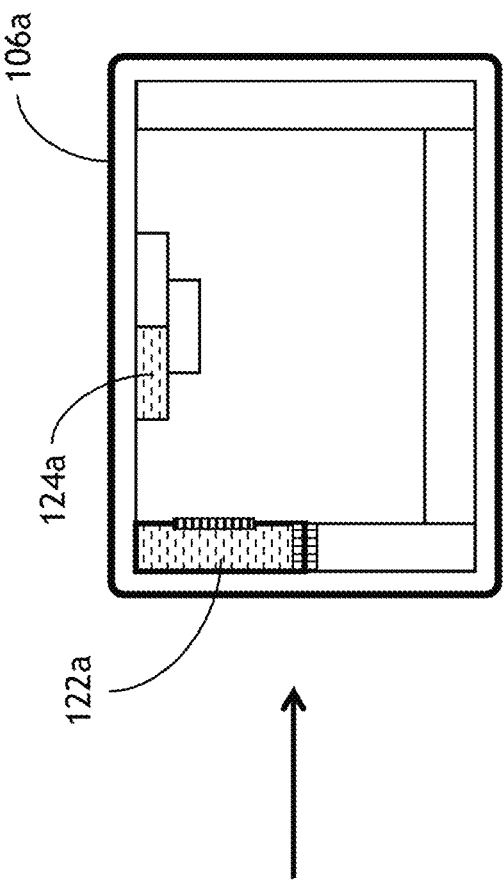
FIG. 4B is a diagrammatic illustration of a primary avionics display interacting with a format selector panel according to embodiments of the inventive concepts disclosed herein.
Figure 4B:
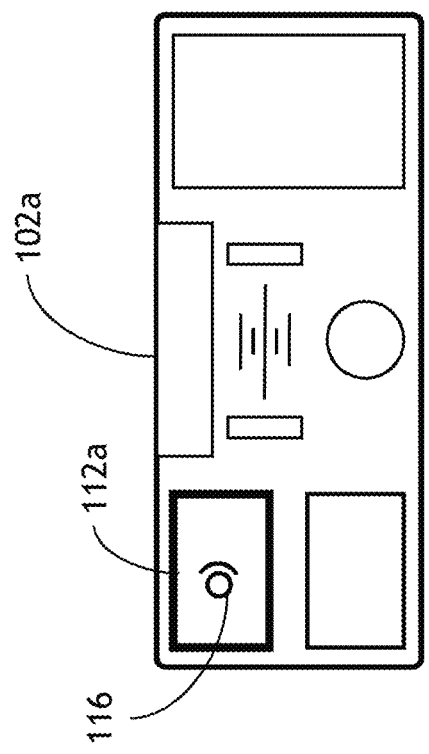

Referring to FIGS. 4A and 4B, the format selector panels (FSP) 106 similarly provide a pilot or crewmember with access to format selector menus (FSM) 114 (the FSMs corresponding to applications or interfaces displayed in MFWs 112) via finger contacts and gestures. For example, as shown by FIG. 4A, the pilot-side FSP 106a may include a series of selectors 122 tying the FSP 106a to the pilot-side primary avionics display 102a. Selectors 122a and 122b, along the left edge of the FSP 106a, may provide FSMs 114a corresponding to the MFWs 112a and 112b positioned along the left side of the pilot-side primary avionics display 102a (as shown by FIG. 2A). By pressing and holding two fingers (116) to the selector 122a, the FSP 106a may display a format selector menu 114a corresponding to the MFW 112a displayed by the primary avionics display 102a. A FSP 106 may be configured to control (ex.—tied to) either primary avionics display (102a, 102b) or the secondary avionics display 104a. For example, the indicator 124a of the pilot-side FSP 106a may show that the pilot-side FSP 106a is currently controlling the pilot-side primary avionics display 102a, while the indicators 124b and 124c correspond to the co-pilot-side primary avionics display 102a and the secondary avionics display 104 respectively. By pressing either indicator 124b or 124c, a pilot or crewmember may access a series of selectors 122 (not shown) tied to the background interfaces 110, foreground interfaces, and MFWs 112 displayed by the co-pilot-side primary avionics display 102b or the secondary avionics display 104. The pilot-side FSP 106a may include additional selectors 122c (corresponding to MFW 112c, on the right side of the pilot-side primary avionics display 102a), 122d (currently unused), and 122e (corresponding to the SVS display 110a displayed by the full-screen background interface 110 of the pilot-side primary avionics display 102a). As with a MFW 112 displayed by a primary avionics display 102 or a secondary avionics display 104, a selector 122 displayed by an FSP 106 may be resized by a single finger swipe 120. For example, swipe bars 118a and 118b provide for horizontal and vertical resizing of the selector 122a, while swipe bars 118c and 118d provide for vertical resizing of selectors 122b and 122c respectively. As shown by FIG. 4B, a pilot may activate a particular selector 122 by tapping one or more fingers (116) to the corresponding MFW 112 of the primary avionics display 102. Tapping (as opposed to "touching and holding" refers to making finger contact with the display surface and promptly removing the one or more fingers once a single, brief contact with the display surface is made. For example, the pilot may tap (116) on a MFW 112a displayed by the pilot-side primary avionics display 102a, thereby highlighting the corresponding selector 122a on the pilot-side FSP 106a (which controls the pilot-side primary avionics display 102a, as shown by the top-left indicator 124a). A selector 122 associated with an interface displayed in a MFW 112 by the secondary avionics display 104 may be displayed by the FSP 106 in the same fashion, i.e., by tapping the corresponding MFW (not shown) displayed by the secondary avionics display 104.

Figure 5:
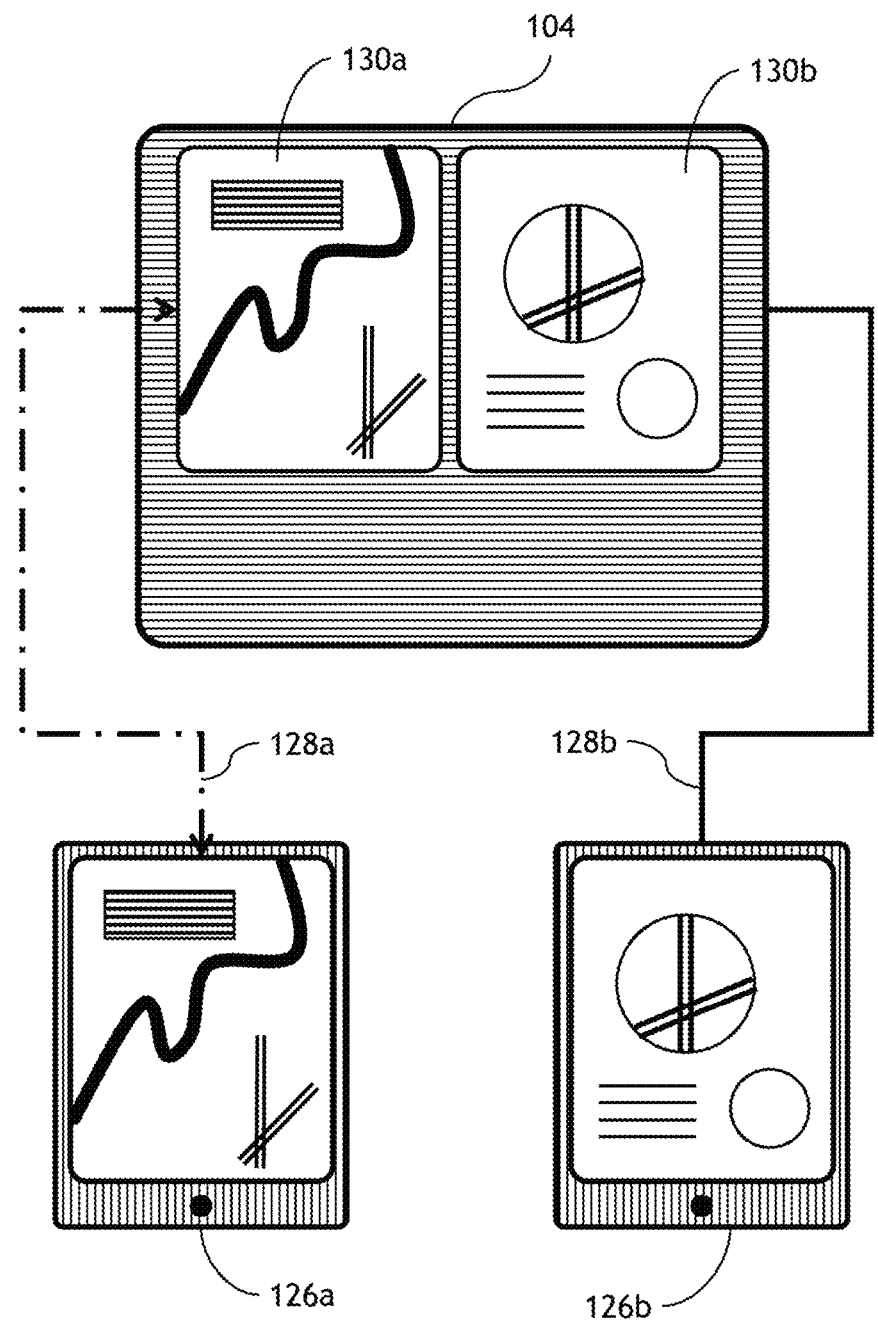
FIG. 5 is a diagrammatic illustration of a secondary avionics display interacting with one or more electronic flight bag (EFB) devices according to embodiments of the inventive concepts disclosed herein.

Referring to FIG. 5, the secondary avionics display 104 may display the same selection of background interfaces 110 or foreground interfaces displayed in MFWs 112 as displayed by either primary avionics display 102. Similarly, as shown by FIGS. 4A and 4B, a pilot may access format selector menus 114 corresponding to, and controlling, the interfaces displayed by the secondary avionics display 104 via either format selector panel 106 by selecting the appropriate indicator 124c (as shown by FIG. 4A). The secondary avionics display 104 may also be used as a rehosting display for one or more pads, tablets, or similar electronic flight bag (EFB) devices 126. Instead of requiring the pilot to position the EFB device 126 where it can be accessed directly, the secondary avionics display 104 may link (128) to the EFB device 126. For example, the link 128 may include either a wireless link 128a or a physical (ex.—wired) link 128b. The EFB device 126 may be activated and stored securely in the cockpit (e.g., in a flight bag). The secondary avionics display 104 may generate a mirror interface (130a, 130b) which mirrors the display windows of EFB devices 126a and 126b (each EFB device 126 corresponding to a pilot, co-pilot, or crewmember), providing the pilot and crew with access to any EFB applications or windows running on the EFB devices 126a, 126b. Any required control interface interaction with the EFB devices 126a, 126b may be provided by finger contacts or gestures with the mirror interfaces 130a, 130b of the secondary avionics display 104, which relays any related commands and avionics events to the EFB devices 126a, 126b via the wireless links 128a, 128b. The pilot may toggle the output of the secondary avionics display 104 between avionics interfaces (as displayed by the primary avionics display 102) and mirror interfaces 130 (as shown by FIG. 5) via either format selector panel 106 (as shown by FIG. 4A), wherein the indicator 124c indicates that the format selector panel 106 is currently tied to the secondary avionics display 104. The secondary avionics display 104 may further incorporate one or more handrests for use by a pilot or co-pilot during turbulent air conditions.

Figure 6A:
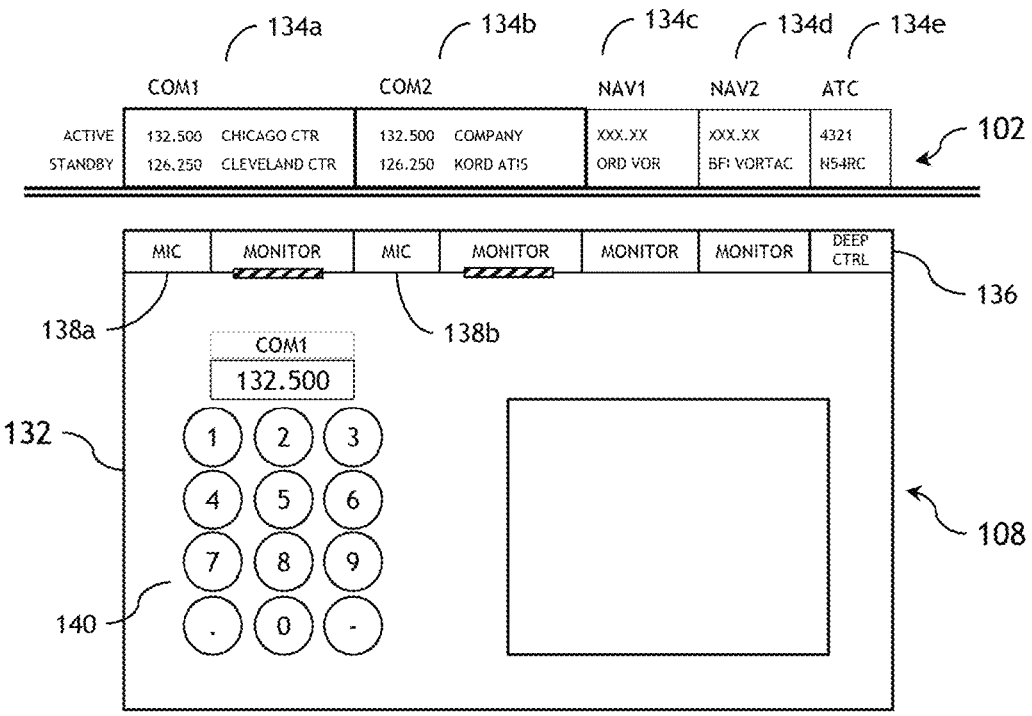
FIG. 6A is a diagrammatic illustration of a keyboard panel according to embodiments of the inventive concepts disclosed herein.
Figure 6B:
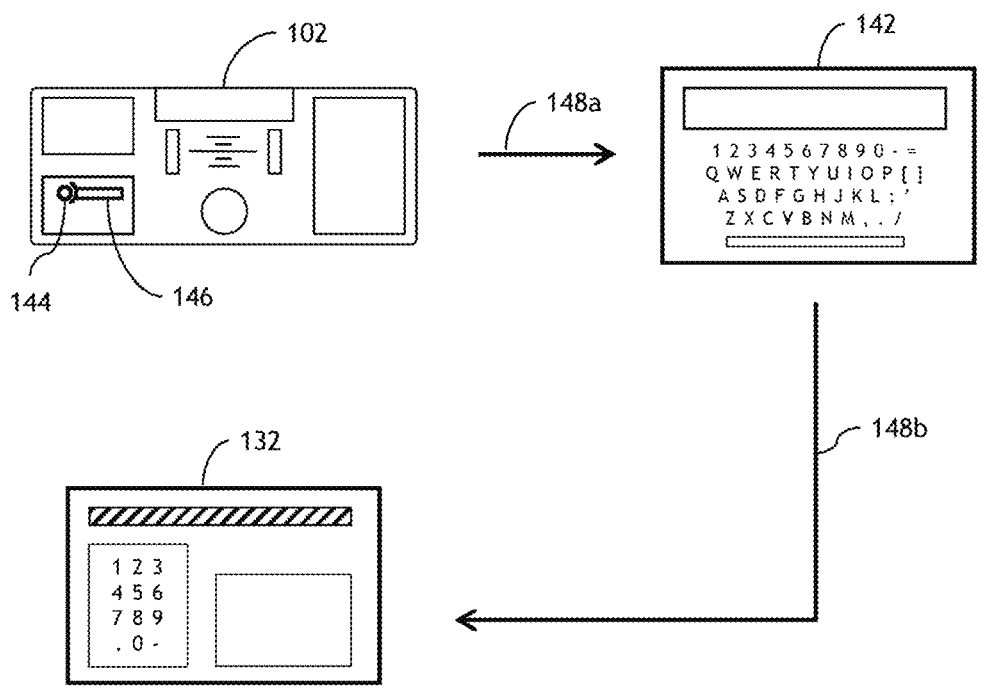
FIG. 6B is a diagrammatic illustration of a primary avionics display interacting with a keyboard panel according to embodiments of the inventive concepts disclosed herein.

Referring to FIGS. 6A and 6B, the keyboard panels 108 of the avionics flight display 100 may generate a default interface 132 which, in conjunction with the primary avionics display 102, provides radio tuning, audio, and communications functionality. For example, referring to FIG. 6A, an adjacent portion of the primary avionics display 102 may display active and standby information corresponding to communications channels 134a and 134b, navigation channels 134c and 134d, and air traffic control (ATC) channel 134e. The corresponding keyboard panel 108 may provide touch-selectable indicators 136 corresponding to the current status of each channel 134 (e.g., actively monitoring, deep control, microphone on). Selectable indicators 138a, 138b may be tapped to activate or deactivate a microphone associated with communications channels 134a, 134b. The default interface 132 of the keyboard panel 108 may include a numeric keypad 140 for resetting communications or transponder frequencies associated with communications channels 134a-134e.

Referring to FIG. 6B, the keyboard panel 108 may display an alternative interface 142 when alphanumeric input is required by the avionics display system 100. For example, the pilot may tap (144) on any text field 146 of a primary avionics display 102 or secondary avionics display (not shown), thereby inducing (148a) the corresponding keyboard panel 108 to display its alternative interface 142. The alternative interface 142 may include a full touch-sensitive alphanumeric keyboard, allowing the pilot or crewmember to enter any necessary information into the highlighted text field 146. The alternative interface 142 may be timed, such that when the keyboard panel 108 activates its alternative interface 142, and a predetermined time threshold is reached (e.g., 20 seconds) during which no finger contact is made with the alphanumeric keyboard of the alternative interface 142, the keyboard panel 108 may revert (148b) to its default interface 132, once again displaying interactive radio control information as shown by FIG. 6A.

Referring back to FIG. 1, the avionics flight display 100 may include one or more physical buttons 152 and one or more volume sliders 154. For example, the physical buttons 152 may include a pilot button, may be used to switch the pilot-side and co-pilot-side display components. For example, the co-pilot-side primary avionics display 102b would generate a SVS 110a in the background (rather than a map display 110d), while the pilot-side primary avionics display 102a would generate a map display 110d in the background (rather than a SVS 110a). Foreground interfaces displayed in MFWs 112 may likewise switch from pilot-side primary avionics display 102a to co-pilot-side primary avionics display 102b, and vice versa. Pushing the button 152 a second time may reset the pilot-side and co-pilot-side display components to their prior settings. The physical buttons 152 may include a home button, which when pushed causes the format selector panel 106 to display a format selector menu 114a (as shown by FIG. 4A). The volume sliders 154 may be used to increase or reduce the operating volume associated with a radio or communications channel 134 controlled by the default interface 132 displayed by the keyboard panel 108 (as shown by FIG. 6A). For example, tapping at least one finger on a portion of the keyboard panel 108 corresponding to a radio frequency or channel may tie the volume slider 154 (as shown by FIG. 1) corresponding to the keyboard panel 108 to that particular radio frequency or channel. The pilot may adjust the volume of the radio frequency or channel by sliding the corresponding volume slider 154 up or down.

Figure 7:
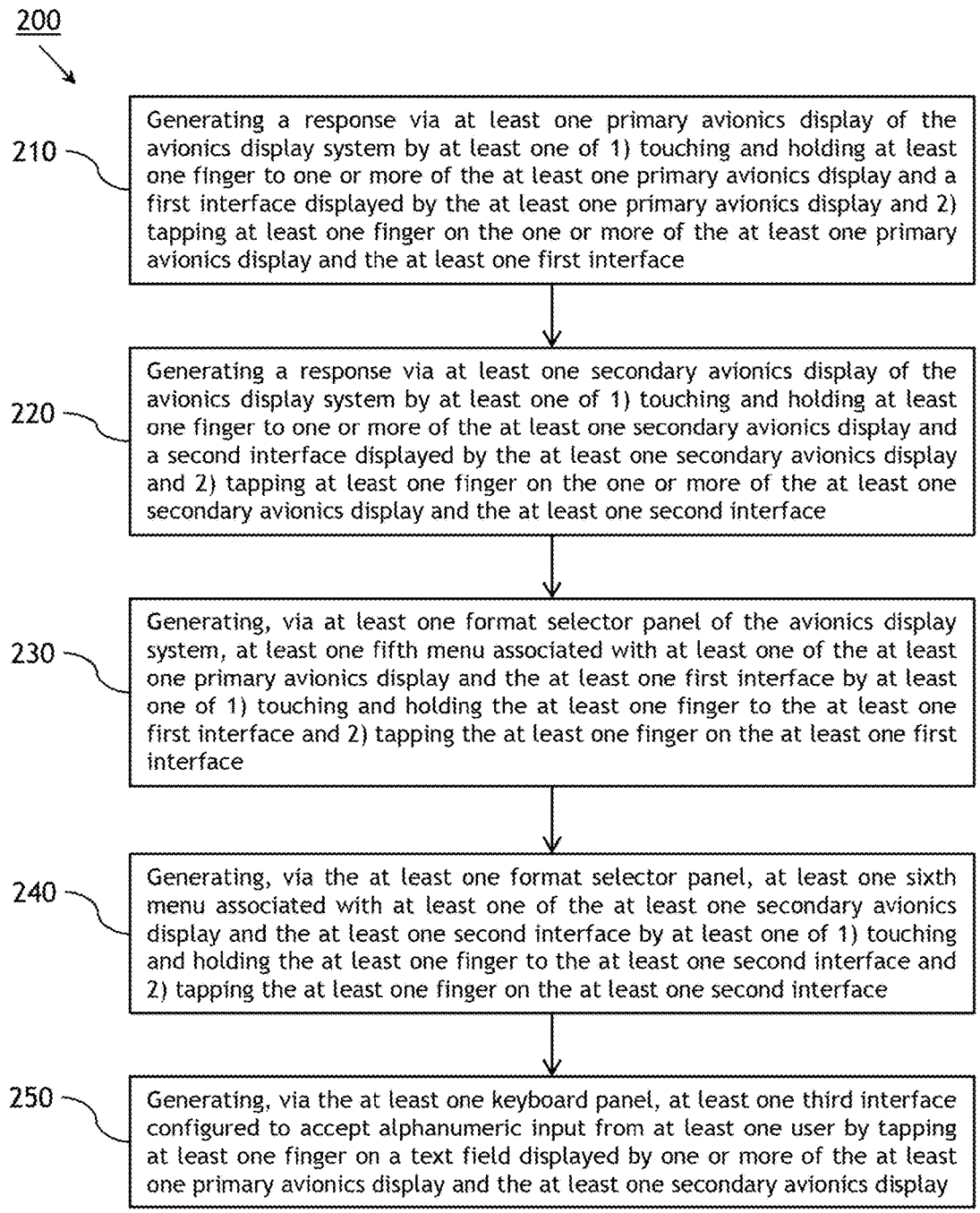
FIG. 7 is a process flow diagram illustrating a method according to embodiments of the inventive concepts disclosed herein.

FIG. 7 illustrates a method 200 for format control via an avionics display system 100 according to embodiments of the inventive concepts disclosed herein. At a step 210, a pilot generates a response via a primary avionics display 102 of the avionics display system 100 by at least one of: 1) touching and holding at least one finger to the primary avionics display 102, or to a first interface displayed by the primary avionics display 102; or 2) tapping the at least one finger to the primary avionics display 102 or on the first interface. The first interface may include a foreground interface displayed in a MFW 112 or a background interface 110.

For example, the pilot may generate a quarter-size menu 114 associated with an MFW 112 displayed in a quadrant of the primary avionics display 102 by touching and holding (or tapping) the at least one finger to (116) the MFW 112. The pilot may generate a half-size menu associated with the primary avionics display 102 in either a center-left or center-right portion of the primary avionics display by touching and holding (or tapping) the at least one finger to (116) the center-left portion or the center-right portion of the primary avionics display. The pilot may resize the MFW 112 by touching and holding the at least one finger to an edge 118 of the MFW 112 and sliding the at least one finger (120) along the primary avionics display 102 in a vertical or a horizontal direction. The pilot may reposition the MFW 112 from a first quadrant of the primary avionics display 102 to a second quadrant by touching and holding the at least one finger to the MFW 112 and sliding the at least one finger (122) along the primary avionics display toward the second display quadrant.

At a step 220, the pilot generates a response via a secondary avionics display 104 of the avionics display system 100 by at least one of: 1) touching and holding at least one finger to the secondary avionics display 104, or to a second interface displayed by the primary avionics display 104; or 2) tapping the at least one finger to the secondary avionics display 104 or on the second interface. The second interface may include a foreground interface displayed in a MFW 112, a background interface 110, or a mirror interface 130.

For example, the pilot may generate a quarter-size menu 114 associated with an MFW 112 displayed in a quadrant of the secondary avionics display 104 by touching and holding (or tapping) the at least one finger to (116) the MFW 112. The pilot may generate a half-size menu associated with the secondary avionics display 104 in either a center-left or center-right portion of the secondary avionics display by touching and holding (or tapping) the at least one finger to (116) the center-left portion or the center-right portion of the secondary avionics display. The pilot may resize the MFW 112 by touching and holding the at least one finger to an edge 118 of the MFW 112 and sliding the at least one finger (120) along the secondary avionics display 104 in a vertical or a horizontal direction. The pilot may reposition the MFW 112 from a first quadrant of the secondary avionics display 104 to a second quadrant by touching and holding the at least one finger to the MFW 112 and sliding the at least one finger (122) along the secondary avionics display toward the second display quadrant.

The method 200 may include additional steps 230, 240, and 250. At a step 230, the pilot generates, via a format selector panel 106 of the avionics display system 100, a menu associated with the primary avionics display 102 or a first interface displayed by the primary avionics display by touching and holding (or tapping) the at least one finger to (116) the first interface. At a step 240, the pilot generates, via the format selector panel 106, a menu associated with the secondary avionics display 104 or a second interface displayed by the secondary avionics display by touching and holding (or tapping) the at least one finger to (116) the second interface. At a step 250, the pilot generates, via a keyboard panel 108 of the avionics display system 100, an interface 142 configured to accept alphanumeric input from a user by tapping at least one finger (144) on a text field 146 displayed by the primary avionics display 102 or the secondary avionics display 104.

While particular aspects of the inventive concepts disclosed herein have been shown and described, it will be apparent to those skilled in the art that, based upon the teachings herein, changes and modifications may be made without departing from the scope of the inventive concepts disclosed herein and their broader aspects and, therefore, the appended claims are to encompass within their scope all such changes and modifications as are within the broad scope of the inventive concepts disclosed herein.

We claim:
1. An avionics display system, comprising:
   at least one primary avionics display configured to display at least one first interface, the at least one first interface including at least one of a first background interface and a first foreground interface, the at least one primary avionics display configured to respond to a first finger contact with the at least one first interface;
   at least one secondary avionics display configured to
   (1) establish at least one of a wired link and a wireless link to at least one mobile avionics device,
   (2) transmit at least one avionics event to an application of the at least one mobile avionics device via the at least one of a wired link and a wireless link;
   (3) display at least one second interface, the at least one second interface including at least one of a second background interface and a second foreground interface,
   (4) display at least one mirror interface associated with the at least one application of the mobile avionics device, and
   (5) respond to a second finger contact with the at least one second interface;
   at least one format selector panel configured to display at least one third interface corresponding to the at least one first interface, the at least one format selector panel configured to respond to a third finger contact with the at least one third interface; and
   at least one keyboard panel configured to
   (1) display at least one fourth interface, the at least one fourth interface associated with at least one status of a communications channel,
   (2) respond to a fourth finger contact with the at least one fourth interface, and
   (3) respond to a fifth finger contact with at least one of the at least one first interface and the at least one second interface by displaying at least one fifth interface configured to accept alphanumeric input from at least one user,
   wherein the avionics display system is embodied in an avionics system installed in an aircraft cockpit.
2. The system of claim 1, wherein:
   the at least one first background interface includes at least one of a map display, a synthetic vision display, a systems management display, and a georeference chart display;
   the at least one second background interface includes at least one of the map display, the synthetic vision display, the systems management display, and the georeference chart display;
   the at least one first foreground interface includes at least one of the map display, the synthetic vision display, the georeference chart display, a primary flight display

(PFD), an engine indication and crew alert system (EICAS) display, and a video display; and the at least one second foreground interface includes at least one of the map display, the synthetic vision display, the georeference chart display, the PFD, the EICAS display, and the video display.

3. The system of claim 1, wherein:

the at least one first foreground interface includes at least one of a sixth foreground interface corresponding to a single quadrant of the primary avionics display and a seventh foreground interface corresponding to two adjacent quadrants of the primary avionics display;

the at least one second foreground interface includes at least one of an eighth foreground interface corresponding to a single quadrant of the at least one secondary avionics display and a ninth foreground interface corresponding to two adjacent quadrants of the at least one secondary avionics display;

the at least one first background interface includes a first full-screen interface configured to surround the at least one first foreground interface; and the at least one second background interface includes a second full-screen interface configured to surround the at least one second foreground interface.

4. The system of claim 3, wherein the at least one first finger contact includes touching and holding at least one finger to an edge of at least one of the at least one first foreground interface and the at least one second foreground interface and sliding the at least one finger in at least one of a vertical direction and a horizontal direction;

the at least one sixth foreground interface is configured to become the seventh foreground interface;

the at least one seventh foreground interface is configured to become the sixth foreground interface;

the at least one eighth foreground interface is configured to become the ninth foreground interface; and the at least one ninth foreground interface is configured to become the eighth foreground interface.

5. The system of claim 4, wherein the edge of the at least one first foreground interface includes a swipe bar configured to receive the at least one first finger contact.

6. The system of claim 1, wherein:

the at least one first finger contact includes at least one of 1) touching and holding at least one finger to the at least one first interface and 2) tapping on the at least one first interface with the at least one finger; and the at least one format selector panel is configured to activate the at least one third interface associated with the at least one first interface.

7. The system of claim 1, wherein:

the at least one first finger contact includes touching and holding at least one finger to at least one of the first foreground interface positioned in a first display quadrant and the second foreground interface positioned in the first display quadrant and sliding the at least one finger toward a second display quadrant;

the at least one primary avionics display is configured to reposition the at least one first foreground interface in the second display quadrant; and the at least one secondary avionics display is configured to reposition the at least one second foreground interface in the second display quadrant.

8. The system of claim 1, wherein:

the at least one first finger contact includes at least one of 1) tapping at least one finger to the at least one first interface and 2) touching and holding at least one finger to the at least one first interface, the at least one first interface corresponding to a first display quadrant, and the at least one primary avionics display is configured to display in the first display quadrant a first menu associated with the at least one first interface and having a first size;

the at least one first finger contact includes at least one of 1) tapping at least one finger to either a first center-left portion or a first center-right portion of the at least one primary avionics display and 2) touching and holding at least one finger to the first center-left portion or the first center-right portion, and the at least one primary avionics display is configured to display in the first center-left portion or the first center-right portion at least one second menu associated with the at least one primary avionics display and having a second size twice the first size;

the at least one second finger contact includes holding at least one of 1) tapping at least one finger to the at least one second interface and 2) touching and holding at least one finger to the at least one second interface, the at least one second interface corresponding to a second display quadrant, and the at least one secondary avionics display is configured to display a third menu associated with the at least one second interface and having a third size;

the at least one second finger contact includes at least one of 1) tapping at least one finger to either a second center-left portion or a second center-right portion of the at least one secondary avionics display and 2) touching and holding at least one finger to the second center-left portion or the second center-right portion, and the at least one secondary avionics display is configured to display in the second center-left portion or the second center-right portion at least one fourth menu associated with the at least one secondary avionics display and having a fourth size twice the third size; and the at least one third finger contact includes at least one of 1) tapping at least one finger to the at least one third interface and 2) touching and holding at least one finger to the at least one third interface, and the at least one third interface is configured to display a fifth menu associated with the at least one third interface.

9. The system of claim 8, further comprising:

at least one home button configured to direct the at least one third interface to display the at least one fifth menu.

10. The system of claim 8, wherein the at least one secondary avionics display is configured to toggle between the at least one second interface and the at least one mirror interface based on the at least one third finger contact with the at least one third interface.

11. The system of claim 1, wherein:

the at least one primary avionics display includes a first primary avionics display associated with a first pilot and a second primary avionics display associated with a second pilot;

the at least one format selector panel includes a first format selector panel associated with the first pilot and a second format selector panel associated with the second pilot;

the at least one keyboard panel includes a first keyboard panel associated with the first pilot and a second keyboard panel associated with the second pilot; and the system further comprises at least one pilot button configured to toggle the system between (1) a first mode wherein the at least one first background interface of the first primary avionics display includes a synthetic vision display and the at least one second background interface of the second primary avionics display includes a map display and (2) a second mode wherein the at least one first background interface of the first primary avionics display includes the map display and the at least one second background interface of the second primary avionics display includes the synthetic vision display.

12. The system of claim 1, wherein the at least one fifth finger contact includes tapping at least one finger on a text field of at least one of a first interface and a second interface, and the at least one keyboard panel is configured to respond to the fifth finger contact by:
   starting a timer concurrent with the displaying of the at least one fifth interface; and
   if the timer expires before the at least one user performs a finger contact with the at least one fifth interface, displaying the at least one fourth interface.

13. The system of claim 1, wherein the at least one fourth finger contact includes tapping at least one finger to the at least one fourth interface, and the at least one fourth interface is configured to:
   adjust at least one communications frequency of the at least one communications channel;
   monitor the at least one communications channel; and
   at least one of activate or deactivate a microphone associated with the at least one communications channel.

14. The system of claim 13, further comprising:
   at least one volume slider configured to adjust the volume of the at least one communications channel, the at least one volume slider having a first direction and a second direction opposite the first direction, the at least one volume slider configured to respond to the at least one fourth finger contact by adjusting a volume of the at least one communications channel in response to touching and holding at least one finger to the at least one volume slider and sliding the at least one volume slider in at least one of the first direction and the second direction.

15. A method for format control via an avionics display system, the method comprising:
   generating a response via at least one primary avionics display of the avionics display system by at least one of 1) touching and holding at least one finger to one or more of the at least one primary avionics display and a first interface displayed by the at least one primary avionics display and 2) tapping at least one finger on the one or more of the at least one primary avionics display and the at least one first interface;
   generating a response via at least one secondary avionics display of the avionics display system by at least one of 1) touching and holding at least one finger to one or more of the at least one secondary avionics display and a second interface displayed by the at least one secondary avionics display and 2) tapping at least one finger on the one or more of the at least one secondary avionics display and the at least one second interface;
   generating, via at least one format selector panel of the avionics display system, at least one fifth menu associated with at least one of the at least one primary avionics display and the at least one first interface by at least one of 1) touching and holding the at least one finger to the at least one first interface and 2) tapping the at least one finger on the at least one first interface;
   generating, via the at least one format selector panel, at least one sixth menu associated with at least one of the at least one secondary avionics display and the at least one second interface by at least one of 1) touching and holding the at least one finger to the at least one second interface and 2) tapping the at least one finger on the at least one second interface; and
   generating, via the at least one keyboard panel, at least one third interface configured to accept alphanumeric input from at least one user by tapping at least one finger on a text field displayed by one or more of the at least one primary avionics display and the at least one secondary avionics display.

16. The method of claim 15, wherein:
   generating a response via at least one primary avionics display of the avionics display system by at least one of 1) touching and holding at least one finger to one or more of the at least one primary avionics display and a first interface displayed by the at least one primary avionics display and 2) tapping at least one finger on the one or more of the at least one primary avionics display and the at least one first interface includes at least one of
   a) generating, in a first display quadrant of the at least one primary avionics display, at least one first menu associated with the at least one first interface, the at least one first interface corresponding to the first display quadrant, the at least one first menu having a first size, by at least one of 1) touching and holding the at least one finger to the at least one first interface and 2) tapping the at least one finger on the at least one first interface; and
   b) generating, in at least one of a first center-left portion of the at least one primary avionics display and a first center-right portion of the at least one primary avionics display, at least one second menu associated with the at least one primary avionics display, the at least one second menu having a second size twice the first size, by at least one of 1) touching and holding the at least one finger to at least one of the first center-left portion and the first center-right portion and 2) tapping the at least one finger on at least one of the first center-left portion and the first center-right portion; and
   generating a response via at least one secondary avionics display of the avionics display system by at least one of 1) touching and holding at least one finger to one or more of the at least one secondary avionics display and a second interface displayed by the at least one secondary avionics display and 2) tapping at least one finger on the one or more of the at least one secondary avionics display and the at least one second interface includes at least one of
   a) generating, in a second display quadrant of the at least one secondary avionics display, at least one third menu associated with the at least one second interface, the at least one second interface corresponding to the second display quadrant, the at least one third menu having a third size, by at least one of 1) touching and holding the at least one finger to the at least one second interface and 2) tapping the at least one finger on the at least one second interface; and
   b) generating, in at least one of a second center-left portion of the at least one secondary avionics display and a second center-right portion of the at least one secondary avionics display, at least one fourth menu associated with the at least one secondary avionics display, the at least one fourth menu having a fourth size twice the third size, by at least one of 1) touching and holding the at least one finger to at least one of the second center-left portion and the second center-right portion and 2) tapping the at least one finger on at least one of the second center-left portion and the second center-right portion.

17. The method of claim 15, wherein:

generating a response via at least one primary avionics display of the avionics display system by at least one of 1) touching and holding at least one finger to one or more of the at least one primary avionics display and a first interface displayed by the at least one primary avionics display and 2) tapping at least one finger on the one or more of the at least one primary avionics display and the at least one first interface includes resizing the at least one first interface by 1) touching and holding the at least one finger to a first edge of the at least one first interface and 2) sliding the at least one finger along the at least one primary avionics display in at least one of a vertical direction and a horizontal direction; and generating a response via at least one secondary avionics display of the avionics display system by at least one of 1) touching and holding at least one finger to one or more of the at least one secondary avionics display and a second interface displayed by the at least one secondary avionics display and 2) tapping at least one finger on the one or more of the at least one secondary avionics display and the at least one second interface includes resizing the at least one second interface by 1) touching and holding the at least one finger to a second edge of the at least one second interface and 2) sliding the at least one finger along the at least one secondary avionics display in at least one of the vertical direction and the horizontal direction.

18. The method of claim 15, wherein:

generating a response via at least one primary avionics display of the avionics display system by at least one of 1) touching and holding at least one finger to one or more of the at least one primary avionics display and a first interface displayed by the at least one primary avionics display and 2) tapping at least one finger on the one or more of the at least one primary avionics display and the at least one first interface includes repositioning the at least one first interface from a third display quadrant to a fourth display quadrant by 1) touching and holding the at least one finger to the at least one first interface and 2) sliding the at least one finger toward the fourth display quadrant; and generating a response via at least one secondary avionics display of the avionics display system by at least one of 1) touching and holding at least one finger to one or more of the at least one secondary avionics display and a second interface displayed by the at least one secondary avionics display and 2) tapping at least one finger on the one or more of the at least one secondary avionics display and the at least one second interface includes repositioning the at least one second interface from a fifth display quadrant to a sixth display quadrant by 1) touching and holding the at least one finger to the at least one second interface and 2) sliding the at least one finger toward the sixth display quadrant.

* * * * *